O. A. HOLLIS.
VEHICLE TIRE.
APPLICATION FILED MAR. 15, 1916.

1,269,182.

Patented June 11, 1918.
2 SHEETS—SHEET 1.

WITNESSES.

INVENTOR, Otis A. Hollis

HIS ATT'Y.

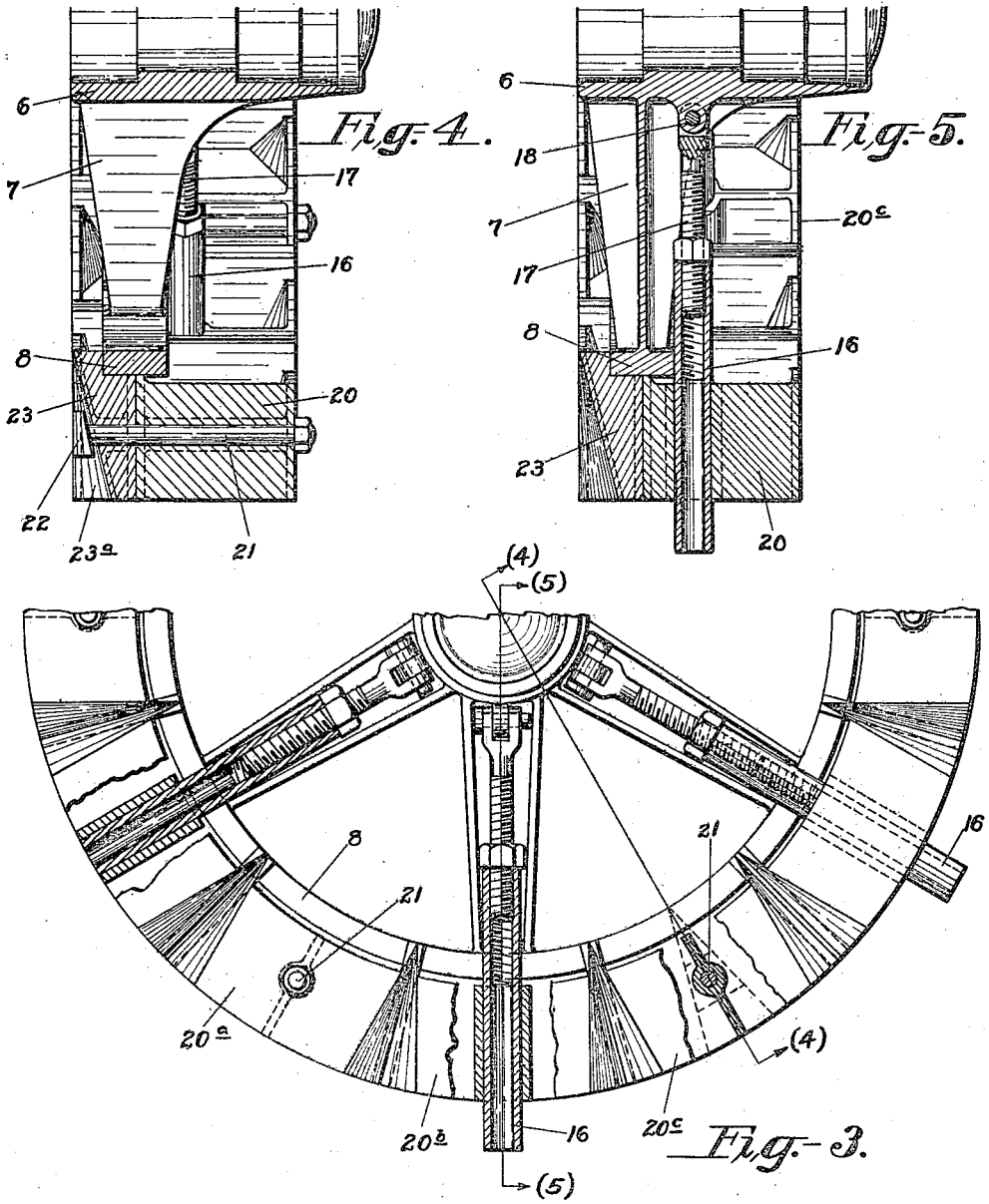

UNITED STATES PATENT OFFICE.

OTIS A. HOLLIS, OF PITTSBURGH, PENNSYLVANIA, ASSIGNOR TO HOLLIS AUTOMATIC TRACTION JACK COMPANY, OF PITTSBURGH, PENNSYLVANIA, A CORPORATION OF DELAWARE.

VEHICLE-TIRE.

1,269,182.   Specification of Letters Patent.   Patented June 11, 1918.

Application filed March 15, 1916. Serial No. 84,417.

*To all whom it may concern:*

Be it known that I, OTIS A. HOLLIS, a citizen of the United States, residing at Pittsburgh, in the State of Pennsylvania, have invented certain new and useful Improvements in Vehicle-Tires, of which the following is a specification.

My invention relates generally to wheels of tractor vehicles, and its primary object is to increase the gripping power of the wheel on the ground, to prevent slipping; to provide the wheel with two kinds of extra gripping devices to suit different kinds of ground, and to provide for ready removal of mud, etc. Further objects are to strengthen the construction and make the parts interchangeable in case of breakage. The invention is illustrated in the accompanying drawings, in which,—

Figure 1:
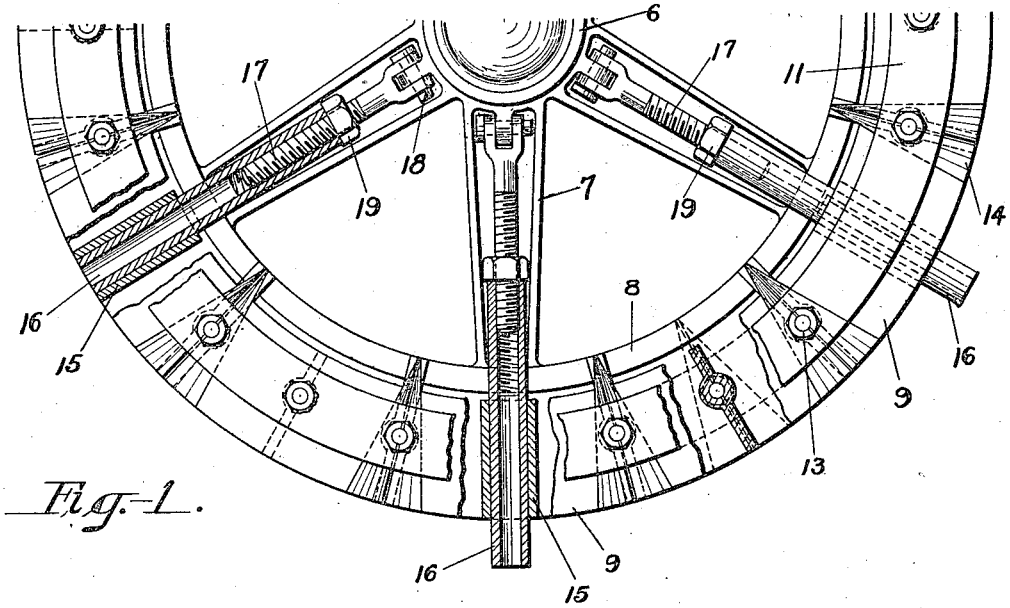
Figure 2:
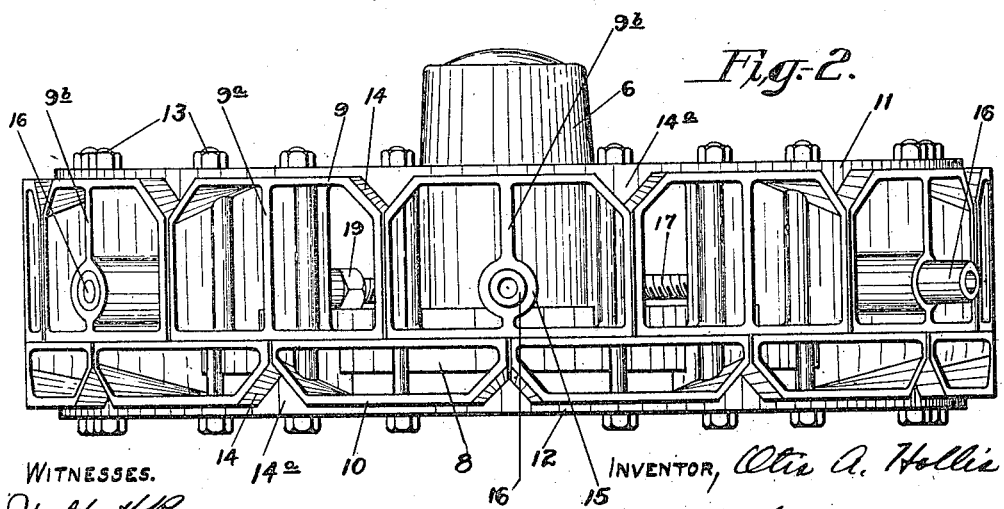

Figure 1 is a half of a side elevation of a wheel containing my invention with partial sections through two of the spokes; Fig. 2 is a plan of the preferred form of wheel; Fig. 3 is a partial side elevation and partial section of a modified form having a different construction of tire; Fig. 4 is a half vertical section of the same on the line (4)—(4) in Fig. 3; and Fig. 5 is a similar section on the line (5)—(5) in Fig. 3.

In the making of automobile vehicles and especially tractors for heavy work, such as drawing farm implements where the character of ground to be traveled over is frequently changed and is frequently very difficult to travel, it is highly important to provide several kinds of gripping surface for the tread of the wheel. I have found that in some grounds the most efficient form is a cup grip or a tread having indentations to take over projections on the ground, whereas in other kinds of ground the most efficient hold is secured by projections from the tread of the wheel; meantime it is highly important to provide for smooth and hard road beds a tread that does not injure the road bed. I therefore have designed a tread which under normal conditions on a hard road presents a substantially flat surface made sufficiently large by multiplying a series of narrow flat elements, and the form is so arranged as to provide for a cup grip at places where the ground is soft enough for the tread to sink in; to this I have arranged for readily protruding a series of projecting pins in case they become necessary.

Thus in the form of wheel shown in the first two figures, I preferably make the hub 6, spoke 7, and rim 8 of integral malleable casting, and form the rim by a series of separate hollow blocks 9 and 10 held together by a pair of rings 11, 12 secured in place by a circumferential series of bolts 13. That is, the blocks 9 and 10 in outline are short sectors having on the outer surfaces beveled edges 14 which are engaged by a series of triangular wedges 14ª, so that the tightening of the rings 11, 12 in a lateral direction not only clamps the blocks together on the rim 8 (as shown more clearly in Fig. 4) but forces the blocks inward toward the center of the wheel by reason of the inclined form of the wedge surfaces 14ª. The blocks 9 and 10 have their interior faces inclined so that the inner opening is much smaller than the outer opening. Thus when the block is pressed down on soft ground the material which enters the hollow block is compressed and wedged in and over the entire surface takes up part of the pressure. At the same time it may be readily removed as the block rises from the ground.

The blocks are formed with their outer edges flat and all flush with the same circumference, and are preferably strengthened by cross ribs 9ª and 9ᵇ, in the case of the larger blocks 9, while generally the smaller blocks 10 do not require the cross ribs. The occasional strengthening ribs 9ᵇ are provided with integral cylindrical portions 15, in which are fitted a series of tubes 16, preferably threaded on the inside for a portion of their length, and engaging screw bolts 17 preferably attached direct to the hub of the wheel by pivoting bolts 18, as clearly shown in Fig. 1. By revolving the tubes 16 therefore they may be adjusted to any position and locked in place by use of nuts 19. (Obviously any convenient means may be employed for revolving all of the tubes 16 at the same time.) As shown clearly in Figs. 4 and 5 these gripping tubes 16 preferably lie directly against the rim 8 of the wheel. While of course the bottoms of the projections 16 could be closed if desired, I prefer the open top form because this gives the gripping effect of a cup at the same time as the tube as a whole forms a projection for a penetrative grip on the road bed.

It will be seen that in the normal condition when the projections 16 are flush with all the other faces of the tread or tire made up of the series of blocks 9 and 10, there is an aggregate of flat surface employed sufficient for hard road beds, and at the same time the tire has a strong anti-slipping grip upon any projections that may be on the road bed. Upon encountering soft ground, the wheel sinks in and immediately the amount of surface called into play to support the weight is increased because of the inclined interior faces of the hollow blocks. At any time and in any place the gripping spokes or projections 16 may be protruded to any desired degree, and they may also conveniently be withdrawn when the occasion for their use is over. In case of breaking of any of the separate blocks 9 and 10, they may be immediately replaced by merely loosening the rings 11 and 12, and without disturbance of any of the other blocks. The open form of the blocks makes it an easy matter to clean mud out of the wheel and in fact it will usually be jarred out by the mere vibration of the vehicle.

In Figs. 3, 4, and 5 I have shown another form of rim or tire in which I dispense with the use of the clamping rings 11 and 12 in Fig. 2, and make the blocks bind themselves. That is, on the rim 8 I place a series of thicker or inside blocks 20 which are cast in sets of three comprising the parts 20ª, 20ᵇ, and 20ᶜ as shown in Fig. 3, and each of these sections is held by a bolt 21 to the outer sections 23, by engagement of the wedge-shaped head 22 of the bolt 21 in the inclined recesses 23ª of the outer blocks 23. Meantime the gripping tubes 16 which are placed intermediately between the bolts 21, assist in holding the blocks 20 by bearing against the rim 8 as shown in Fig. 5. It will be noted that the cast blocks 20 and 23 have their ends overlapping in each instance so that in the design shown the entire rim is built up of four integral sections each composed of the blocks 20 and 23, the ends of which are held together by the bolts 21. The operation and function of the hollow gripping surfaces and the projecting tubes 16 are as before described. The numerous other advantages of this construction will readily occur to those familiar with the art.

Having thus described my invention and illustrated its use, what I claim is the following:

1. A vehicle traction wheel provided with extensible tubular projections at the tread of the wheel, substantially as described.

2. A traction wheel comprising a hub, spokes and rim, and a tire built up of hollow blocks having recesses adapted to engage the road bed.

3. A vehicle wheel having a tire rigidly built up of separable hollow blocks presenting cups to the road bed.

4. A vehicle wheel having a tire or tread portion with a series of open cups and some of said cups capable of individual adjustable projection beyond the mean surface of the tread.

5. The combination with a traction wheel, of a series of tubes extending through the tread of the wheel and adjustable in radial position, substantially as described.

6. A gripping device for a driving wheel comprising a screw rod attached to a rigid portion of the wheel and a threaded tube engaging said rod and passing through the tread of the wheel and having means to adjust its projection, substantially as described.

In testimony whereof I have hereunto signed my name.

OTIS A. HOLLIS.

Copies of this patent may be obtained for five cents each, by addressing the "Commissioner of Patents, Washington, D. C."